May 6, 1952

B. C. HARNEY 2,595,522

FEED MECHANISM AND CONTROL SYSTEM
FOR BAR FEEDS FOR SCREW MACHINES

Filed July 8, 1948

INVENTOR.
Bernard C. Harney
BY
Bodell & Thompson
Attorneys

May 6, 1952

B. C. HARNEY 2,595,522

FEED MECHANISM AND CONTROL SYSTEM
FOR BAR FEEDS FOR SCREW MACHINES

Filed July 8, 1948

INVENTOR.
Bernard C. Harney
BY
Attorneys

Patented May 6, 1952

2,595,522

UNITED STATES PATENT OFFICE 2,595,522

FEED MECHANISM AND CONTROL SYSTEM FOR BAR FEEDS FOR SCREW MACHINES

Bernard C. Harney, Syracuse, N. Y., assignor to Lipe-Rollway Corporation, Syracuse, N. Y., a corporation of New York Application July 8, 1948, Serial No. 37,646

3 Claims. (Cl. 29—60)

The invention relates to bar feeds for standard automatic metal working machines, or screw machines, which include, as standard mechanism, a hollow rotating spindle in the head of the machine, through which the bar stock to be machined is fed step by step, a collet at the inner end of the spindle having a closing and opening movement to grip and release the bar stock, actuating mechanisms for rotating the spindle and actuating the turret and its tools to feed the tools into and out of operative position to the work bar, including a motor actuated drive shaft, motion transmitting means between the drive shaft and the spindle, and motion transmitting means between the drive shaft and the turret and the tools, and the collet opening and closing means, the latter motion transmitting means comprising a clutch shiftable into and out of engaged position. When disengaged, the turret, tools and collet opening and closing mechanisms are stopped, the spindle and the collet, however, continue to rotate. There is also a stop, or stops, carried by the turret and movable into the path of the end of the bar to limit the feeding of the bar beyond the collet when open, to a predetermined distance. There is also a swing stop on the head operated by the collet into position to stop a new bar while a cut-off, or facing off tool is operating on the advance end of a new bar. The next feeding operation feeds the new bar with the faced off end against the stop on the turret.

The bar feed mechanism includes a reciprocally movable push plunger which moves in one direction along a guide or feed tube to push the stock bar through the spindle and the open collet of the screw machine into position where its end projecting beyond the collet is machined by the tools and the finished machined end cut off, means to actuate the plunger to feed the bar step by step, and to withdraw the plunger in one stroke in the guide when the bar becomes to short to have a finished piece machined therefrom, and means for placing a new bar in the guide in front of the withdrawn plunger for the repeated operation. The plunger is actuated by a power operated reciprocating actuator.

In its broadest aspect, the invention has for its general object a control system which consists, in addition to reversing the flow of power to opposite ends of a reversible main motor for the reversible actuator for the feed plunger, in a branch power line supplying power to one end of a reversible motor for the screw machine clutch having a control member operable to effect the flow of power when the actuator approaches the limit of its plunger feeding stroke and a second branch power line leading to the other side of the clutch motor and having a control member therein operable to open the second branch to the flow of power to the opposite end of the clutch motor when the actuator is at the beginning of its plunger feeding stroke.

The invention also, in its broader aspect, comprises a control member in the first branch operated into position to conduct power by the throw out movement of the lever opening and closing the collet so as to insure that the collet will stop in open position when the machine clutch is thrown out. Also, the invention comprises a motor for releasing the lock for holding out the swing stop and operated to release the swing stop only when both control members in the first branch are operated to power conducting position, or operated only simultaneously with the disengaging of the machine clutch.

As the power selected is compressed air, the motors are reciprocating ones, as cylinder and piston motors, and the control members are valves. There is a main reciprocating motor for the feed plunger, the piston rod being the actuator for the feed plunger. There is also a reciprocating motor for engaging and disengaging the screw machine clutch, and a reciprocating motor for a magazine mechanism for feeding the bars one by one into the feed tube.

More specifically the invention has for its object, a control system for the actuating of bar feed mechanism comprising a master reversing or control member, or valve controlling the flow of air to opposite ends of the main cylinder, and a pair of control members or valves connected in series in a branch of the power line leading from the reversing valve and supplying air to the machine clutch cylinder to throw out the machine clutch, and to an air operated device for reversing the reversing valve in one direction, one of the valves in series being located to be opened by the actuator when it approaches the limit of its plunger or bar feeding stroke, and the second valve to be opened by the collet operating lever when operated by the screw machine mechanism to open the collet, so that the second valve, although opened each time the collet is opened, does not conduct air until the first valve is opened, to throw out the machine clutch and open the valve for reversing the master reversing valve in one direction to open up the power line to the other end of the main cylinder and cause the piston actuator to retract the plunger while the collet remains open and the machine clutch is disengaged, means including a control member or valve operated by the actuator as the actuator approaches the limit of its retracting stroke to reverse the master control valve in the other direction so that the actuator starts on its plunger, or bar feeding stroke, and an additional control member or valve located in a branch line leading from the reversing valve, which line is open when the actuator is on its plunger or bar feeding stroke, to the other end of the machine clutch cylinder, the additional valve being located to be opened by the actuator just after it has started on its plunger or bar feeding stroke, so that the machine clutch reengages, the collet closes, and the machine tools resume their operation just after the first feeding movement of a new bar.

The invention consists in the novel features and in the combinations and constructions hereinafter set forth and claimed.

In describing this invention, reference is had to the accompanying drawings in which like characters designate corresponding parts in all the views.

Figure 8 is a schematic view of the motion transmitting means between the piston rod and the bar feed pusher.

Figure 5:
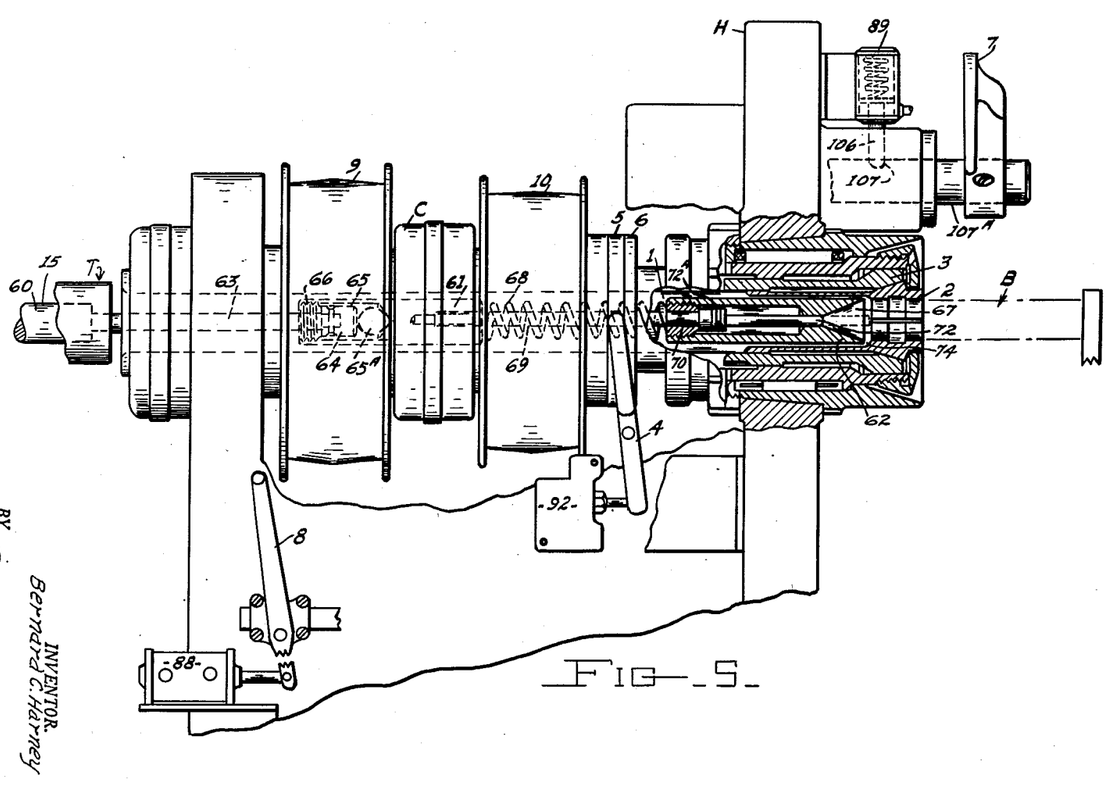
Figure 5 is a fragmentary enlarged side elevation, partly in section, of the head of a conventional screw machine showing the control valve operated by the operating yoke for the collet of the machine, the yoke for operating the clutch for the mechanism of the screw machine and the swing stop.

An automatic machine tool, or screw machine, embodies a rotating hollow spindle 1, Figure 5, through which the bar B is fed, a collet 2 for gripping the bar, this having the usual opening and closing movement and being opened and closed by a sleeve 3 shiftable axially of the spindle 1 and shifted by a yoke lever 4 pivoted to the head H of the machine and working in a groove 5 in a collar 6 shiftable axially of the spindle. The lever 4 is operated by the standard mechanism of the screw machine controlled by the screw machine clutch. The head H of the screw machine also carries a swing stop 7 of the usual construction. This is actuated by the mechanism for opening and closing of the collet 2, through a torsion spring coiled about the rock shaft of the stop, into a position opposite the end of the spindle into the path of the bar being fed. The torison spring is loaded by the opening movement of the collet mechanism. Usually, this swing stop moves during each operation. In this machine, it is held from being actuated by the torsion spring by a lock, and the lock is released so that the swing stop can swing to operative position at the end of the last feeding movement of the bar, and after the remnant has been ejected by the ejector, as will be hereinafter described. The swing stop mechanism, with the exception of the lock, is standard in certain types of screw machines.

The screw machine mechanism also includes a normally engaged clutch which controls the operation of the turret and tools of the machine, and also the collet opening and closing mechanism. The clutch mechanism includes an operating shift lever 8. The mechanism of the screw machine per se forms no part of this invention and insofar as this invention is concerned, it is important only in that the operation of the yoke lever 4 of the collet to open the collet, operates a control member, or valve, which serves, with another control member or valve operated by the actuator as the actuator approaches the end of its plunger feeding movement, to effect the throwing out of the machine clutch and the reversing of the power reversing mechanism, or the actuator, in one direction so that the plunger starts on its withdrawing movement. The spindle is rotated constantly by belts passing from the rotating drive shaft of the machine, which is not controlled by the machine clutch, over pulleys 9 and 10 on the spindle, and over pulleys on the drive shaft. The belt passing over the pulley 9 rotates the spindle in a normal or forward direction. The belt passing over the pulley 10 is twisted to rotate the spindle reversely. Either pulley 9, 10, is clutched to the spindle, and the other unclutched, by a clutch operated by a manually shiftable collar C.

Figure 1:
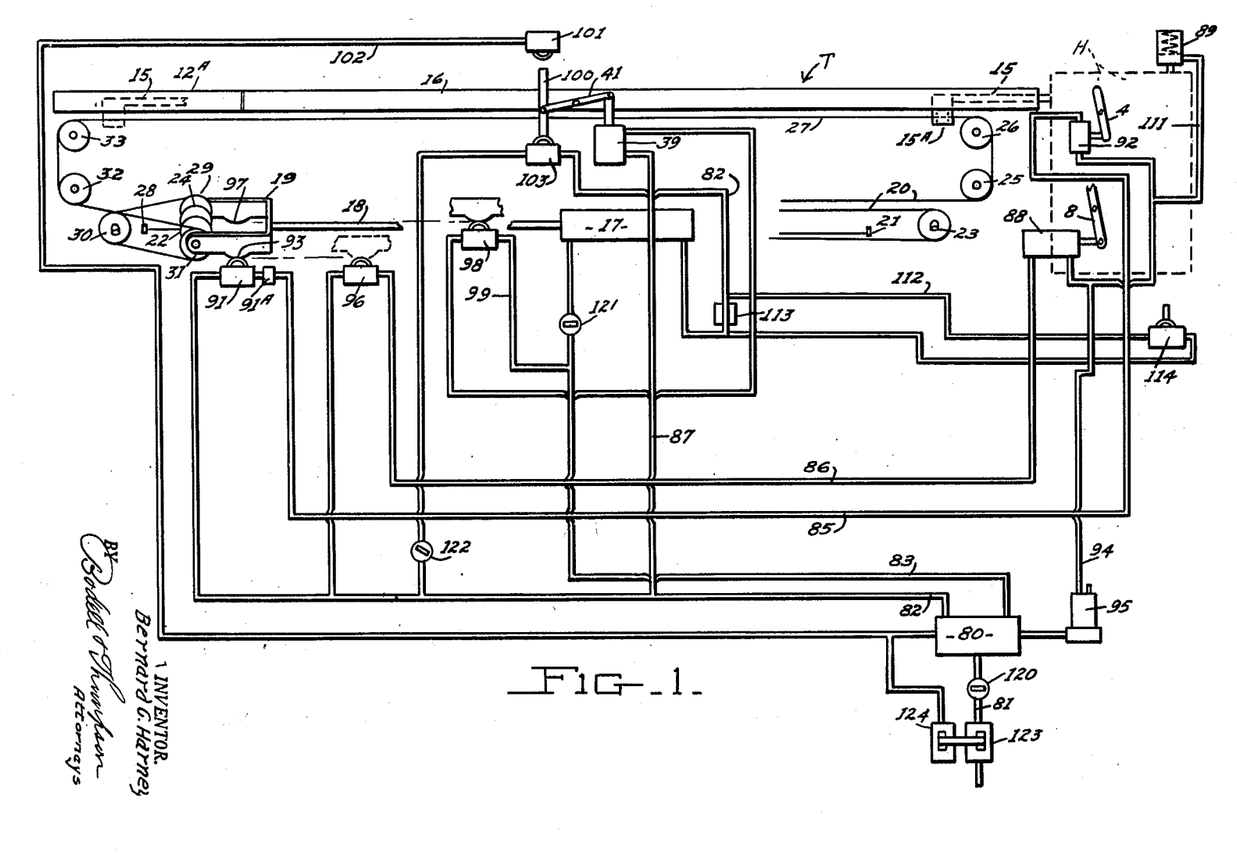
Figure 1 is a diagrammatic view of the actuating and control system.
Figure 6:
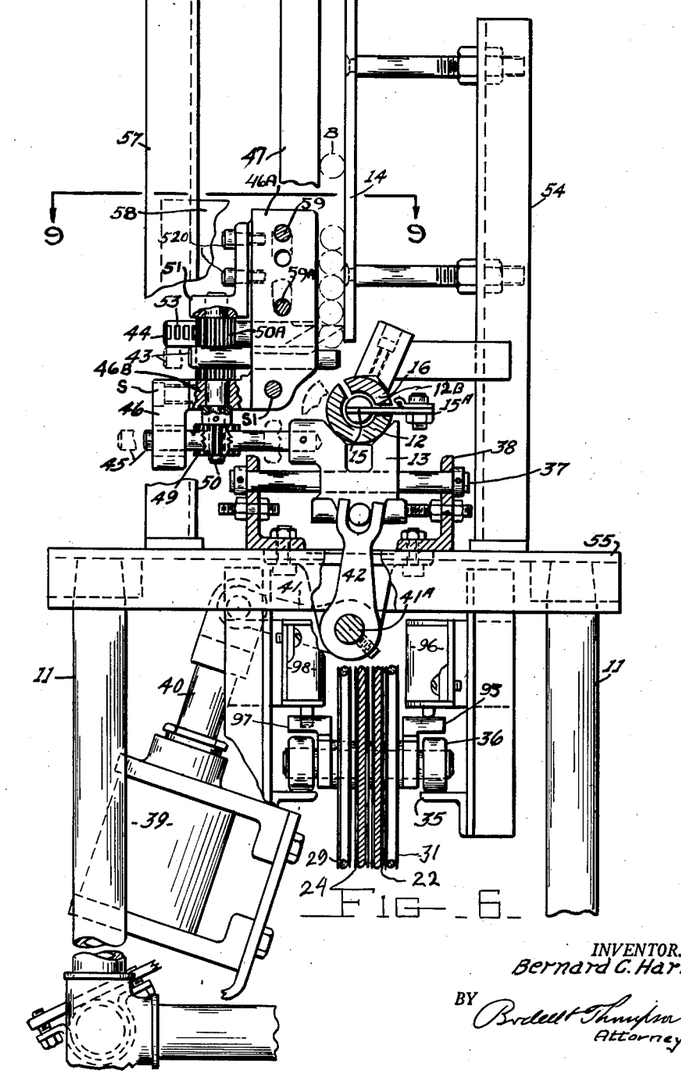
Figures 6 and 7 are enlarged views of the magazine feeding mechanism and contiguous parts taken approximately on lines 6—6 and 7—7, Figure 2.
Figures 7, 9, 10:
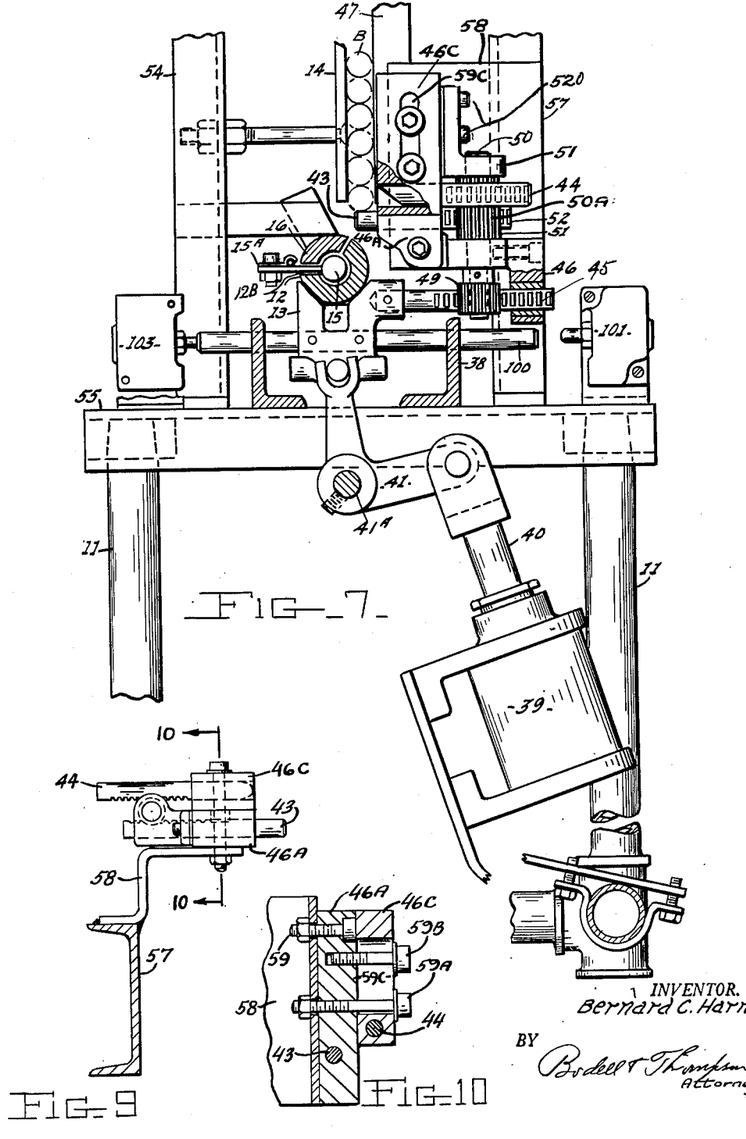
Figure 9 is an enlarged sectional view on line 9—9, Figure 6.
Figure 10 is a sectional view on line 10—10, Figure 9.

The bar feed itself comprises a suitable frame designated generally 11, a guide as a tube T, Figure 1, comprising a body or cradle segment 12, Figures 6 and 7, mounted on a carriage 13 carried by the frame 11, the cradle or tube segment 12 being normally alined with the spindle and shiftable laterally out of and into alinement with the spindle to pick up a new bar from a magazine 14 mounted on the frame, and returnable with it into alinement with the spindle, a reciprocally movable feed plunger 15 movable in the tube, and actuating mechanism including a double acting cylinder and piston motor, and motion transmitting means between the piston rod and the plunger. The tube includes a stationary segment 16 which does not move with the carriage 13, so that the major part of the guide tube, that is the cradle segment 12 mounted on the carriage, separates therefrom during the lateral movement to the left, Figure 6, or to the right, Figure 7, into position to pick up a new bar from the magazine. The guide tube includes a complete stationary section 12A, Figures 2, 3 and 4, similar to a breech block located to receive the plunger 15 when at the limit of its withdrawal stroke. There is a slot 12B between the segments 12 and 16, and a slot 12C, Figure 4, in the breech block section 12A of the tube T, in which the coupling, to be described, works. The segment 16 is a cover for a lengthwise opening or slot in the segment or body 12, through which slot the bars are fed sidewise into the tube or the segment 12. One of the parts 16 or 12 has a movement to open and close the slot and, as here illustrated, the part or tube 12 has an opening and closing movement. The stationary or breech block section 12A is secured to horizontal plates 200 having angular side flanges secured to the upright flanges of the angle iron frame bars 38, Figures 2, 3, 4, 6 and 7, by bolts 201.

17 designates the main cylinder, and 18 the rod of the piston movable therein. The cylinder is suitably carried by the frame beneath the guide tube. When the piston moves in one direction, as to the left Figure 1, the plunger 15 is moved in the opposite direction, or to the right, to feed the bar in the tube through the spindle and, when the piston moves to the right, the plunger 15 is retracted to the left into the breech block section 12A. As here illustrated, the motion transmitting means between the piston rod and the feed plunger consists of cables connected to the plunger 15 by a coupling 15A to pull in opposite directions thereon, one cable pulling when the piston is moving to the left, while the other is slack, and the other only pulling when the piston is moved to the right, while the former cable is slack, the cables passing over the pulleys of a tackle block on the end of the piston rod 18. The coupling 15A works in the slots 12B and 12C.

19 designates the tackle block or yoke mounted on the outer end of the piston rod 18. 20 designates the cable which is tensioned during the movement of the piston rod 18 in a direction to feed the plunger and the bar stock, this cable being anchored at one end at 21 to the frame and passing over a pulley 22 of a tackle block carried by the yoke 19, then around pulley 23 fixed to the frame, thence around the second tackle block pulley 24, then around idler pulleys 25, 26, to the coupling 15A. The other cable 27 is anchored at 28 to the frame and passes around tackle block pulley 29, thence around pulley 30 carried by the frame, thence around tackle block pulley 31, then around idler pulleys 32, 33, carried by the frame, and thence to the coupling 15A. This cable and tackle block arrangement is primarily a simple motion transmitting means for translating through a 1 to 4 ratio the motion of the piston to the plunger in opposite directions, one cable being under tension, and the other slack during movement of the piston in one direction, and the other cable being under tension and the first cable slack during movement of the piston in the opposite direction. The yoke or tackle block 19 is movable along suitable tracks 35, Figure 6, on the frame, and is here shown as provided with rollers 36 movable along the tracks.

The carriage 13 for the feed tube body or cradle segment 12 is, as shown in Figures 6 and 7, mounted on transverse guide rods 37 carried by angle iron frame members 38 on the main frame 11 above the cylinder and piston motor 17, 18, and the motion transmitting mechanism. The carriage 13 is actuated by a double acting cylinder and piston motor 39 carried by the frame, the piston having its rod 40 connected to the carriage 13 through an angle lever 41 mounted at its angle on a rock shaft 41A mounted in the frame. As the piston in the cylinder 39 moves in one direction, it shifts the body or segment 12 of the guide or feed tube to the left, Figure 6, or to the right Figure 7, into position to receive bars B from the magazine 14, and as the piston in the cylinder 39 shifts in the opposite direction, the carriage 13 takes the body or cradle segment 12 back to its original position wherein it is closed by the fixed section 16 of the feed tube. Rock arms 42 are mounted at spaced points on the shaft 41A and connected to the carriage 13.

The escapement mechanism operated by the carriage 13, for feeding the bars one by one from the magazine, includes a reciprocally movable transverse escapement bar 43 on which the lowermost stock bar B normally rests, and a transversely movable cut-off bar 44 normally arranged out of the magazine and movable into the magazine as the bar 43 moves from under the lowermost stock bar B out in the magazine. The escapement bars 43, 44, Figures 6 and 7, are actuated by the carriage 13, and the carriage 13 is provided with a laterally extending rack bar 45 slidable in a bracket 46 which is secured to an upright frame member 47 forming one side of the passage of the magazine 14, the rack bar meshing with a pinion 49 mounted on an upright shaft 50. An extended pinion 50A is formed on said shaft 50 and meshes, on diametrically opposite sides thereof, with racks 52 and 53 on the escapement bars or rods 43, 44, so that the escapement rods shift in opposite directions relative to each other. That is, when the rod 43 moves out from under the lowermost bar in the magazine, the rod 44 moves under the next to the lowermost bar in the magazine, and then when the carriage 13 moves back to its normal position, the rest bar 43 moves under the now lowermost bar of the magazine, and the cut-off bar 44 moves out of the magazine into the position shown in Figures 6 and 7. The cut-off rack bar 44 is mounted to be adjusted vertically for stock bars B of different diameters. Each bracket 46, as shown, consists of an upright body 46A, a laterally extending arm 46B at the lower end of the body terminating in a downturned flange, these parts being secured together as by screws S, S¹. The lower escapement rod 43 is slidably mounted in the body 46A. The upper cut-off escapement rod 44 is slidably mounted in a carrier block 46C slidably mounted on the body 46A of the bracket 46 to be adjusted vertically. The shaft 50 is journalled at its lower end in the horizontal angular arm 46B of the bracket 46, and at its upper end in an angular bracket 56 fixed, as by screws 520, to the body 46A of the bracket 46. There are a plurality of carriage escapement members spaced along the magazine to operate in unison. However, in one only of the carriages does a rod 100 operate control members or valves 101 and 103, hereinafter described. One side wall of the passage of the magazine is supported by upright channel bars 54 rising from the frame 11, or the table 55 thereof. The upright wall 47 for the other side of the passage of the magazine 14 is supported from the main frame of the table by upright frame members 57.

As here shown, the body 46A of the bracket 46 is supported by an angular bracket plate 58 secured to the upright frame member 57, and the vertically adjustable carrier block 46C is secured to the body 46A. The body 46A is secured to the bracket plate 58 by a bolt 59, the head of which is located in a counterbore in the body 46A, and a second bolt 59A, the carrier block 46C for the upper cut off rod 44 is adjustably secured to the body 46A by the bolt 59A and by a screw 59B which extend through a vertical slot 59C in the carrier block 46C. The screw 59B threads into the body 46A of the bracket 46. The bolt 59A extends through the body 46A and the bracket plate 58, and with the bolt 59 secures the body 46A of the bracket 46 to the bracket plate 58.

Figures 2, 3, 4:
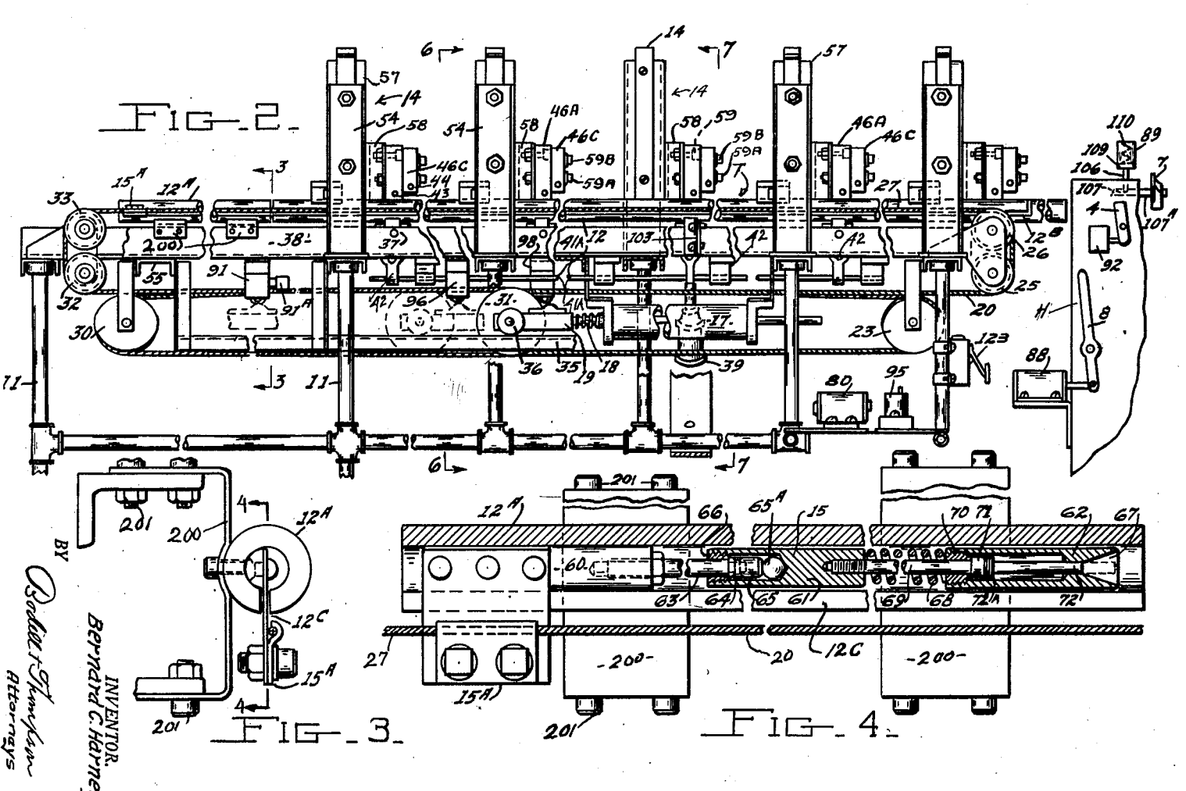
Figure 2 is a fragmentary side elevation, partly broken away, of the machine.
Figure 3 is an enlarged fragmentary sectional view, parts being omitted, on line 3—3, Figure 2.
Figure 4 is a sectional view on line 4—4, Figure 3.

The plunger, which is designated generally 15, is shown in Figures 4 and 5. It consists of axially spaced heads or sections 60, 61, 62, and connections between them. The head 60 is secured to the coupling 15A and an ejector extends axially through the outer head 62 and is operated by relative axial movement of the intermediate head 61 and the outermost head 62. The heads 60 and 61 are connected together by an axial rod or neck 63 secured against rotation to the head 60 and extended axially into a socket 64 in the intermediate head 61. The rod has a shoulder 65 thereon in the socket which thrusts against a ball 65A in the inner end of the socket. The rod 63 is held from displacement out of the socket by a plug 66 threading into the outer end of the socket. The joint between the rod 63 and the head 61 permits rotation of the heads 61, 62, with the stock bar B when the bar B is gripped by the collet. The head 62 is formed with a conical socket 67 at its outer end for receiving the end of the bar stock. The connection between the heads 61 and 62 consists of a compression spring 68 between them for transmitting the pushing force of the head 61 to the head 62 during the bar feeding movement, and an axial rod 69 anchored at one end in the head 61 and slidable through an externally threaded plug or nut 70 threading into the rear end of a socket in the head 62. A shoulder 71 on the rod 69 within the socket abuts against the nut or plug 70 and transmits the withdrawing movement of the heads 60 and 61 to the head 62.

The ejector is shown as a rod 72 slidable axially through the section 62 and through the bottom of the bar receiving socket 67. The ejector rod 72 is fixed to, and usually an integral axial extension of, the rod 69. It is provided with the shoulder 71. The ejector is initially adjusted axially so that its end will project when fully operated only a short distance beyond the outer end of the section 62, as about ⅛th of an inch, as by spacers or washers 72A between the collar 71 and the bottom wall of the socket 67. The head 60 does not pass out of the feed tube T during the feeding movement as the bar becomes shorter. The heads 61, 62, however, feed into the spindle of the machine as the bar shortens and eventually the rod 63 bridges the gap between the feed tube and the spindle.

The feeding movement of the plunger 15, or the head 62 thereof, is limited by a stop 74, Figure 5, at the inner ends of the jaws of the collet. When the head 62 engages the stop 74, the heads 60 and 61 continue to advance, compressing the spring 68, and the rod 69 pushes the ejector 72 to a predetermined stop arranged with washers or spacers 72A. Ejector 72 pushes the stock bar through the collet jaws to a point approximately ⅛th of an inch beyond the stop 74. At this point, the machine cut-off tool will cut off that portion of the remaining stock bar projecting beyond the collet jaws. This portion may not be a full length piece which will make it scrap, but this cutting up of the remaining piece is necessary to assure the ejection of the small piece still remaining in the collet jaws by the new stock bar. In other words, the ejector 72 limits the length of the stock bar remnant left in the collet jaws to be ejected by the next bar of stock to a length ⅛th of an inch less than the length of the collet jaws plus the distance from the face of the collet to the cut-off tool.

The above arrangement is used when a swing stop is not used. When a swing stop is used to definitely locate the new bar of stock for end facing, the length of the remnant left in the collet jaws can be controlled by using stock cut to an approximate specified length. When this arrangement is used, the washers or spacers 72A are removed, or adjusted, so that the ejector pushes the short remnant completely out of the collet jaws.

The new feature of the control system lies in power lines located to throw out the machine clutch as the actuator approaches the end of its plunger feeding stroke and to reengage the machine clutch at the start of the plunger feeding stroke of the actuator so that the reversing of the machine clutch is correlated or tied in with and timed by the reversing of the main motor for the actuator.

In its entirety, the feature of the control system is an arrangement of power control members by which the following operations are automatically performed in sequence, starting with the feed plunger at the limit of its bar feeding movement in the guide or tube and has ejected the remnant of the bar too short for a finished work piece.

The operations controlled by the arrangement of the control members are:

(a) simultaneously reversing the power to the main motor to withdraw the plunger, reversing the motor for the clutch of the screw machine to disengage the clutch while the collet of the screw machine is open, and releasing a lock applied to the screw machine which holds the swing stop out of operative position during all previous machine operations on the bar, instead of letting it swing into operative position after each cut-off operation so that the screw machine (with the exception of the spindle) is stopped while the plunger is being retracted by the main motor;

(b) opening and closing the guide or magazine mechanism to place a new bar in front of the retracted plunger;

(c) reversing the main motor to start the plunger on its repeated bar feeding stroke; and (d) reversing the machine clutch motor to reengage the machine clutch just after the plunger is started on its bar feeding stroke and has been fed against the swing stop. The reengaging of the clutch causes the regular mechanism of the machine to close the collet and to return the swing stop out of its operative position and the lock to hold it in its locked position.

As the collet opens and closes in a fraction of a second, and is opened and closed by the screw machine mechanism controlled by the machine clutch, and further as it is requisite that the mechanism of the machine, with the exception of the rotating spindle, stop when the collet is open, so that the remnant of the bar can be ejected by an ejector, or pushed out by a new bar, a second control member is located in the power line in series with the first and located in position to be operated to conduct the power, by the collet opening movement of the collet shifting lever. In screw machines, the collet opens after each cut-off operation. Both control members are therefor in position to cut in the power at the same time only after the last cut-off operation on a bar when the actuator is at the limit of its bar feeding stroke, that is, when the feed plunger 15 encounters the stop 74.

When the master reversing member or valve element is reversed at the same time the machine clutch is disengaged, the power is transferred through another line to the motor of the actuator to withdraw it in one stroke on a return stroke and operate magazine mechanism which feeds a new bar from a magazine into the feed tube in front of the withdrawn plunger, and also operates a control member to again reverse the master reversing control member to its first position so that the actuator starts on a new plunger or bar feeding stroke after a new bar has been picked up by the tube and the tube closed.

Specifically, the control system comprises a master reversing valve 80 connected to a supply pipe 81, conduits 82, 83, leading therefrom to opposite ends of the main cylinder 17, the conduit 82, leading to the end of the cylinder to which air is supplied to actuate the piston rod 18 in a direction to feed the bar, having branches 85, 86 and 87 therein, the branch 85 having valves in series therein opened respectively by the simultaneous throwing out operation of the yoke 4 for the collet, and by the movement of the actuator or piston rod 18 when it approaches the limit of its bar feeding movement, to conduct the air to one end of the air motor 88 which actuates the yoke 8 of the machine clutch to throw out the clutch, and also to the cylinder 89 which releases the swing stop, and further to a valve which effects the reverse of the master valve in the opposite direction; the branch 86 having a valve therein for controlling the flow of air to the other end of the motor 88 to throw in the machine clutch and located to be operated by the actuator when at the beginning of its bar feeding stroke, and the branch 87 being connected to one end of the cylinder 39 to shift and hold the feed tube in its normal position through the lever 41.

91 and 92 designate the valves in the branch 85 located to be operated respectively by a cam 93 on the tackle block yoke 19 at the end of the piston rod 18, as the piston approaches the end of its plunger feeding stroke, and by the collet operating yoke 4 so that, when both are opened, air will flow to one end, as the right end of the cylinder 88, which operates the yoke 8 of the machine clutch to throw out the clutch, and will also pass through the pipe 94 to open a breather or two-way pilot operated normally closed valve 95 connected to the right end of the master valve 80, permitting the reversing mechanism of the master valve to reverse to close the conduit 82 and open the conduit 83.

96 is the normally closed valve in the branch 86 arranged to be opened by the cam 93 on the tackle block 19 during the first part of the outward or bar feeding movement of the piston rod 18 to the left, this branch being connected to the other or left end of the cylinder 88 for the machine clutch, so that when the valve 96 is opened, the machine clutch will be reengaged. The branch 87 leads to the lower end of the shift cylinder 39 for the shiftable segment 12 of the feed tube. The valves 91 and 92 are opened at the same time only when the tackle block 19 has been moved with the piston rod 18 to the limit of the outward or bar feeding movement of the piston rod, although the valve 92 is opened each time the collet opens, as it does preliminary to each step by step feeding of the bar, or after each cut-off operation of the screw machine. These two valves 91, 92, control the opening and the holding open of the collet after the last cut-off operation of the machine tools on the bar by stopping the machine tools due to the throwing out of the machine clutch by the yoke 8 when both valves 91 and 92 are open. It will be understood that the collet is opened and closed by the yoke 4, and the yoke 4 actuated by the mechanism of the machine controlled by the machine clutch.

When the master valve 80 is reversed in one direction by the opening of the valves 91 and 92, the air then passes through the conduit 83, to the left end of the cylinder 17, withdrawing the piston rod 18 and yoke 19 to the right. During the latter part of this withdrawing movement, a cam 97 on the tackle block 19 opens a valve 98 in a branch 99 of the main conduit 83, which branch leads to the upper end of the cylinder 39 to actuate its piston in a reverse or downward direction, Figure 1, through the lever arm 41 which shifts the carriage 13 for the feed tube segment 12 out of alinement with the spindle in position to receive a new bar from the magazine 14. This movement of the carriage 13 for the shiftable feed tube section 12 causes a shift rod 100 on the feed tube carriage 13 to be shifted upward, Figure 1, (through lever 41), into engagement with a normally closed breather, or normally closed pilot valve 101 in a line 102 leading to the left end of the master reversing valve 80, and thus, when the valve is opened, evacuates the operating air of the reverse mechanism therefrom to cause the valve 80 to shift into position to again cut in the air to the main conduit 82 which supplies air to the right hand end of the cylinder 17 although the air is momentarily stopped, or delayed, from passing to the right end of the cylinder by a valve 103, until the air first passes through branch 87 of now energized line 82 to the lower end, Figure 1, of cylinder 39, actuating the piston therein upward to shift the feed tube carriage 13 to carry the tube section 12 with the new bar therein back into alinement with the spindle of the screw machine and cause the rod 100 to open the valve 103 in line 82, letting air pass to the right end of the cylinder 17.

Now, upon the initial movement of the piston rod 18 to the left, or in a direction to again feed the bar, the cam 93 on the yoke 19 opens a valve 96 in the branch 86 of the now open conduit 82, and air passes to the left end of the machine clutch cylinder 88 and reengages the machine clutch, causing the collet to close, and the machine tools to resume their operation.

At the end of the new outward bar feeding stroke, the cam 93 on the yoke 19 reengages and opens the valve 91, permitting air to flow to the valve 92 through the restricted orifice or needle valve 91A so that air pressure builds up in the valve 92 before the opening thereof by the collet lever 4 at the end of the feeding movement of the plunger. The built up pressure thus instantly passes to the right end of the machine clutch cylinder 88 and shifts out the machine clutch, thus stopping the mechanism of the machine with the collet open, and also to the breather valve 95, reversing the master valve 80, so that the flow of air is transferred from the pipe 82, to the pipe 83, and air instantly passes through the pipe 83 to the left end of the cylinder 17 and moves the piston rod 18 and yoke 19 to the right, pulling back the push plunger in the feed tube to the limit of its movement to the left. Both valves 91 and 92 are then deenergized, but the machine clutch remains in its out position and hence, the collet remains open, and also the swing stop remains in the position to which it has shifted to limit the first feeding movement of the new bar.

The swing stop lock comprises a locking bolt 106 which enters a hole 107 (Figure 5) in swing stop rock shaft 107A located to aline with the bolt when the swing stop returns to its starting position against the action of its torsion spring by the collet opening and closing mechanism. The construction of the swing stop is the same as in standard screw machines, with the exception of the locking bolt. This is operated by an air motor consisting of the cylinder 89 supported on the head of the screw machine, a piston 109 in the cylinder, the rod of which projects through the wall of the head and constitutes the bolt 106. The piston is pressed by a spring 110 in one direction to press the bolt into the hole 107 when the hole is alined therewith, and is actuated to withdraw the bolt by air pressure controlled by the valves 91, 92. The cylinder is connected by a pipe 111 to the pipe leading from the valve 92 to the machine clutch cylinder 88, and to the breather valve 95 for one end of the master valve. When both control valves 91, 92, are opened, the air passes to the cylinder 89 to withdraw the piston 109 and the locking bolt against the spring 110.

Certain small and flexible sizes of bar stock buckle and coil up under the pressure of the push plunger and the rotation of the spindle when the collet is closed on the bar. This machine embodies a provision for releasing the pressure, or the greater part thereof, on the push plunger 15 when the collet is gripping the bar. This means consists of a by-pass 112 leading from spaced apart points on the feed conduit 82 between the valve 103 and the cylinder 17, with a manually operable cut-off valve 113 in the pipe 82 between the branches of the by-pass 112, and a valve 114 in the by-pass arranged to be opened and timed in its opening and closing by a cam embodied in the regular standard mechanism of the screw machine, to open the valve and hence, relieve the pressure to the right end of the cylinder 17 after each feeding movement of the bar, and again close the valve to the releasing of pressure after the bar cutting-off operation of the machine tools. This valve is a three-way valve in series with the valve 103 in the pipe line 82. When open, the air passes from the open valve 103, through the by-pass 112 to the right end of the cylinder 17 around the manually closed valve 113, and when closed by the cam of the screw machine mechanism, closes the by-pass 112 to the passage of air from the open valve 103 and opens the by-pass from the valve 114 to the cylinder 17 to the exhaust of air from the cylinder 17. The cam opens the valve 114 to exhaust when the collet closes on the bar.

The valves used are all standard types purchased in the open market. The valves 91, 92, 98, 103, 96, which are self-closing, two-way valves are opened mechanically as, respectively, by the cam 93, collet yoke lever 4 when operated to open the collet, the cam 97, the rod 100, and the cam 93, to permit the air to pass therethrough when the line 82 or 83 is energized through the master valve 80. The valve 96 is operated idly when the piston rod 18 and tackle block 19 is on its withdrawing stroke to the right, Figure 1, as the power line 82 is then de-energized, or not under pressure. Likewise, the valve 98 is opened idly by the cam 97 when the piston rod 18 and tackle block 19 are on their plunger feeding stroke to the right, as the power line 83 is exhausted, or not under pressure. All valves are normally closed two-way ones except the valve 114 which is a three-way normally closed one, and the valve 95 which is a two-way normally closed pilot operated one.

The valve 91 is located to be opened by the cam 93 in advance of the time the piston rod 18 and yoke 19 reaches the end of the bar feeding movement, and this valve is provided with a restricted outlet or orifice at 91A which slows up the flow of air to the closed valve 92, and full pressure is built up in the valve 92 after the valve 91 opens, but before valve 92 opens, so that the air is relayed by the valve 92 instantly to the machine clutch cylinder 88 and the screw machine mechanism stopped immediately after the last cut-off operation of the bar with the collet open. For accurate timing and because the valve 91 is remote from the valve 92, the valve 91 is located to be opened by the cam 93 on feeding of the bar ahead of the last feed movement, or just after the next to the last cutting off operation of the tools of the screw machine.

The breather or exhaust valve 101 is opened by the rod 100 and when opened relieves an air bound condition in the reversing mechanism of the valve 80, or permits air to exhaust to the outer air from the air operated reversing mechanism of the master valve 80, and the valve 80 to reverse direction opposite to the reverse controlled by the valve 95. The valve 95 is opened by air pressure in the branch line 94 of the power line 82, and when open relieves an air bound condition in the master control valve 80, or exhausts air from the mechanism of the reversing valve 80 to the outer air, causing it to reverse. The valve 114 is a three-way valve, as previously described.

The master reversing valve 80 is a standard commercial type. It consists of a casing in which works a slide valve shifted by differential pressure of air within the casing. The differential pressure is controlled by valves 95—101. When valve 95 opens, it relieves an air bound condition in a chamber at the right end casing of the valve 80 and the slide therein, permitting the pressure of the air in another opposing chamber in the casing of the valve to unbalance opposing pressures on the slide and shift the slide to the right to open the pipe 83 to the flow of air from the valve 80, and open the pipe 82 to exhaust through a port in the casing. When the valve 101 opens, it relieves an air bound condition in a chamber at the left end of the casing of the valve 80 and permits the air pressure in the casing to overcome a balanced condition on the slide and shift the slide to the left, opening the pipe 82 to the flow of air and cutting off the pipe 83 and opening it to exhaust through ports in the casing of the valve 80. Suitable pressure regulating valves 120, 121 and 122 are located in the feed pipe 81, line 82, to the right end of the cylinder 17, and in the line 83 leading to the left end of the cylinder 17. A cut-off valve 123 is provided to turn the air off and on to the master reversing valve 80. This is a three-way valve and exhausts the line 81 when it is turned off. An auxiliary valve 124 is used as an exhaust valve only, this being connected to the pipe 102 leading from the valve 101. The use of the valve 124 is used primarily because of the character of the reversing valve 80. Its purpose is to insure that the power feed mechanism will restart on its plunger feeding stroke when the bar feed mechanism is stopped intermediate of its cycle by operating the valves 123 and 124, and to guard against the picking up of a new bar from the magazine while there is still part of an old bar in the magazine. If the stop is made by the operating of the valves 123, 124, when the plunger is on its retracting stroke, upon restarting the plunger will move idly and quickly on a bar feeding stroke, no bar being in the feed tube, and will then automatically again move on its retracting stroke. If a stop is made while the plunger is on its bar feeding stroke and then the cycle again started by returning the valves 123, 124, to their normal position, the push plunger will resume its feeding in a bar feeding direction instead of retracting and picking up a new bar.

In the general operation, assume that the feed plunger has reached the limit of its bar feeding movement to the right and the actuator to the limit of its movement to the left, the power line 82 and its branches 85, 86, 87, have been energized during this movement and the valve 103 held opened by the rod 100 because the feed tube is closed. As the actuator yoke 19 has approached the end of the plunger feed movement, the cam 93 has opened the valve 91, letting the air pass through the orifice 91A and the pressure to build up in the closed valve 92 so that when the valve 92 is opened by the collet lever 4 during its last collet opening movement, the air quickly passes to the swing stop lock cylinder 89 to release the swing stop to the right end of the machine clutch cylinder 88, throwing out the machine clutch and to the valve 95, causing the master reversing valve to reverse, cutting out the line 82 and cutting in the line 83. The power then passes from the master reversing valve 80, through the line 83 directly to the left end of the main cylinder 17, withdrawing the piston rod 18 to the right and the plunger to the left in one stroke. As the yoke 19 reaches the end of the withdrawing movement, the cam 97 opens the valve 98 in the branch 99 of line 83 and indirectly effects a delayed reversing of the master valve 80 until the feed tube 12 is opened, a new bar fed thereinto in front of the retracted plunger 15 and the tube again closed. This delay and the opening and closing of the feed tube is effected as follows: The opening of the valve 98 permits the air to flow to the upper end of the cylinder 39 and shift the shiftable section of the feed tube to open the tube, through the lever 41 and pick up a new bar. The air pressure in the line 82 and branches 85, 86, 87, exhausts out through the master valve 80 when the valve 80 is reversed, as described, to cut out the line 82 and cut in the line 83. The opening movement of the feed tube causes the pin or rod 100 to open the valve 101, and also permits the valve 103 to close. The opening of the valve 101 opens the pipe 102 to release the air pressure from the left end of the master valve 80, permitting the master valve to again reverse to again cut in the line 82 and cut out the line 83. This causes the air to again pass through its branch 87 to the lower end of the cylinder 39 and close the feed tube on the new picked up bar, or shift the section 12 of the tube back to normal position in line with the machine spindle, and also causes the rod 100 to again open the valve 103 in the line 82 to the right end of the cylinder 17. The power is thus delayed from passing to the right end of the cylinder 17 until the feed tube shifts back to normal position under the power to the lower end of the cylinder 39 through the branch 87, and causes the rod 100 to again open the valve 103. As the actuator begins its bar feeding movement to the left, the cam 93 on the yoke 19 opens the valve 96, letting the air pass from line 82 and branch 86 to the left end of the clutch cylinder 88 and reengage the machine clutch 80, so that the machine resumes its cycle on the new bar.

What I claim is:

1. A power control system for stock bar feeds for screw machines, the bar feed being characterized by a guide for the stock bar, a feed plunger movable along the guide in one direction to feed the plunger and in the opposite direction to withdraw the plunger to receive a new bar in front of it, an actuator for the plunger and a reversible motor for the actuator, the screw machine being characterized by a rotatable hollow spindle in which the stock bar is fed, a collet in the spindle rotatable therewith, mechanism for rotating the spindle and for opening and closing the collet, comprising an operating lever for the collet, a drive shaft, and a clutch having an engaging and throw-out movement to clutch and declutch said mechanism to and from the drive shaft, a reversible motor for the screw machine clutch; the power control system comprising a power feed line having two branches leading to opposite ends of the reversible motor for the actuator, a main reversible control member between the branches, means for reversing the control member, one branch leading to one end of the clutch motor and to said means for effecting the reversing of the main reversible control member therein, said one branch having a sub-branch to the other end of the clutch motor, first and second control members in said one branch and its sub-branch located to be opened respectively by the actuator when it approaches the end of its plunger feed stroke and at the beginning of its plunger feed stroke, the system being characterized by a third control member in said one branch in series with the control member which is opened by the flow of power when the actuator approaches the limit of its plunger feed stroke, the third control member being opened by the collet operating lever, and means operated by the actuator when at the end of its plunger retracting stroke to re-reverse the main control member and control means in the branch to the actuator motor for initiating feed action thereof.

2. A power control system for stock bar feeds for screw machines, the bar feed being characterized by a guide for the stock bar, a feed plunger movable along the guide in one direction to feed the plunger and in the opposite direction to withdraw the plunger to receive a new bar in front of it, the guide being a tube having a longitudinal slot through which the stock bars are fed sideways and a closure for the slot, the tube and the closure having a relative opening and closing movement and a reversible motor to effect the relative opening and closing movement, an actuator for the plunger and a reversible motor for the actuator, the screw machine being characterized by a rotatable hollow spindle in which the stock bar is fed, a collet in the spindle rotatable therewith, mechanism for rotating the spindle and for opening and closing the collet, comprising an operating lever for the collet, a drive shaft, and a clutch having an engaging and throwout movement to clutch and declutch said mechanism to and from the drive shaft, a reversible motor for the screw machine clutch; the power control system comprising a power feed line having two branches leading to opposite ends of the reversible motor for the actuator, a main reversible control member between the branches, means for reversing the control member, one branch leading to one end of the clutch motor and to said means for effecting the reversing of the main reversible control member therein, said one branch having a sub-branch to the other end of the clutch motor, first and second control members in said one branch and its sub-branch located to be opened respectively by the actuator when it approaches the end of its plunger feed stroke and at the beginning of its plunger feed stroke, the system being characterized by a third control member in said one branch in series with the control member which is opened by the flow of power when the actuator approaches the limit of its plunger feed stroke, the third control member being opened by the collet operating lever, a fourth control member in said main branch to said motor for the actuator normally open to the flow of power, the other main branch also having a sub-branch to one end of the reversible motor for effecting the opening and closing of the feed tube, the sub-branch having a fifth control member normally closed to the flow of power and operable to open it to the flow of power by the actuator when at the limit of its retracting stroke, and means operable by the opening and closing of the feed tube to close the fourth control member during the opening of said tube and to open it during the closing of the feed tube, and a sixth control member operable by the closing operation of the feed tube to re-reverse the master control member.

3. A power control system for stock bar feeds for screw machines, the bar feed being characterized by a guide for the stock bar, a feed plunger movable along the guide in one direction to feed the plunger and in the opposite direction to withdraw the plunger to receive a new bar in front of it, the guide being a tube having a longitudinal slot through which the stock bars are fed sideways and a closure for the slot, the tube and the closure having a relative opening and closing movement and a reversible motor to effect the relative opening and closing movement, an actuator for the plunger and a reversible motor for the actuator, the screw machine being characterized by a rotatable hollow spindle in which the stock bar is fed, a collet in the spindle rotatable therewith, mechanism for rotating the spindle and for opening and closing the collet, comprising an operating lever for the collet, a drive shaft, and a clutch having an engaging and throw-out movement to clutch and declutch said mechanism to and from the drive shaft, a reversible motor for the screw machine clutch; the power control system comprising a power feed line having two branches leading to opposite ends of the reversible motor for the actuator, a main reversible control member between the branches, means for reversing the control member, one branch leading to one end of the clutch motor and to said means for effecting the reversing of the main reversible control member therein, said one branch having a sub-branch to the other end of the clutch motor, first and second control members in said one branch and its sub-branch located to be opened respectively by the actuator when it approaches the end of its plunger feed stroke and at the beginning of its plunger feed stroke, the system being characterized by a third control member in said one branch in series with the control member which is opened by the flow of power when the actuator approaches the limit of its plunger feed stroke, the third control member being opened by the collet operating lever, and means operated by the actuator when at the end of its plunger retracting stroke to re-reverse the main control member, control means in the branch to the actuator motor for initiating feed action thereof, a swing stop carried by the screw machine and normally out of the path of the stock bar and self returning out of the path of the stock bar, a motor for latching it into the path of the stock bar connected in the said one branch and one end of the clutch motor when operated by the collet lever.

BERNARD C. HARNEY.

REFERENCES CITED

The following references are of record in the file of this patent:

UNITED STATES PATENTS

| Number | Name | Date |
|---|---|---|
| 2,148,348 | Groene et al. | Feb. 21, 1939 |
| 2,165,912 | Whitman | July 11, 1939 |
| 2,300,457 | Mariotte | Nov. 3, 1942 |
| 2,308,348 | Ballash | Jan. 12, 1943 |
| 2,334,272 | Mariotte | Nov. 16, 1943 |
| 2,352,184 | Bullard | June 27, 1944 |

FOREIGN PATENTS

| Number | Country | Date |
|---|---|---|
| 471,525 | Great Britain | Sept. 6, 1937 |